Jan. 29, 1963 J. M. CHAMBERS ET AL 3,075,890
PURIFICATION OF NAPHTHALENE BY DISTILLATION
Filed Nov. 24, 1958

INVENTORS
JOHN M. CHAMBERS
HARRY D. ROBINSON, JR.
BY
Morgan, Finnegan, Durham & Pine
ATTORNEYS.

United States Patent Office 3,075,890
Patented Jan. 29, 1963

3,075,890
PURIFICATION OF NAPHTHALENE BY DISTILLATION
John M. Chambers, Westfield, N.J., and Harry D. Robinson, Jr., Abington, Mass., assignors to Stone & Webster Engineering Corporation, Boston, Mass., a corporation of Massachusetts
Filed Nov. 24, 1958, Ser. No. 775,947
9 Claims. (Cl. 202—39.5)

This invention relates to the refining of crude naphthalene and relates more particularly to the refining of so-called Commercial Grade crude naphthalene, that is, partially purified crude naphthalene of coal tar or petroleum origin, to produce so-called Refined Grade naphthalene, that is naphthalene of freezing point (F.P.) 79.7° C.

The purification of crude naphthalene according to conventional commercial practices, usually requires extraction with caustic, one or more batch distillations, and treatment with sulphuric acid, followed by caustic treatment.

It is an object of this invention to enable purification of crude naphthalene with less expense and with increased yield of refined naphthalene through better recovery from the low grade stock and elimination of acid refining losses.

It is another object of this invention to enable the accomplishment of the aforesaid purification to be carried out in continuous fashion in a single distillation process.

It is still another object of this invention to provide a new and improved process for purifying naphthalene.

Other and further objects of this invention will appear from the following description, the accompanying drawings and the appended claims.

According to this invention the naphthalene is purified by a specific continuous process of extractive and azeotropic distillation using certain oxygenated liquids which have been discovered to be effective agents. In general, two liquid agents, one an extractive agent and the other an azeotropic agent, are employed independently for the purpose. The extractive agent is an oxygenated compound of relatively high boiling point capable of extracting from vapors of the crude naphthalene, impurities more polar than naphthalene and also capable of forming a low boiling azeotrope with naphthalene and of forming azeotropes having a lower boiling point than the naphthalene azeotrope with impurities in the feed which are normally close boiling to naphthalene. Preferably, the high-boiling extractive agent is ethylene glycol although it is within the contemplation of this invention to use as extractive agents other relatively high boiling oxygenated compounds such, for example, as glycerol or benzyl alcohol.

The azeotropic agent is an oxygenated compound of relatively low boiling point which is capable of forming low boiling azeotropes with hydrocarbons of lower polarity than naphthalene. Preferably, the azeotropic agent is water, although it is within the contemplation of this invention to use as azeotropic agents other relatively low boiling oxygenated compounds such, for example, as ethanol or acetic acid.

In carrying out the process of the invention crude naphthalene is fed to a fractionating column, and vapors of the crude naphthalene are caused to rise in the column countercurrent to a downflowing stream of the high-boiling extractive agent. Because the extractive agent is specified to have a high solubility for naphthalene, it has a natural tendency to extract the naphthalene and carry it down the column. However, it is an essential feature of this invention that the column be operated by a sufficient adjustment of the usual flow and heating controls, in a manner to controvert this natural tendency and to cause the naphthalene to rise as a vapor to the top of the column, forming, together with any unavoidably vaporized quantity of the extractive agent, the vapor fraction obtained from the distillation, which contains all of the desired naphthalene product. The vapor fraction is condensed to a liquid and cooled for recovery of its content of desired refined naphthalene as set forth below. The liquid residue from the distillation, comprised principally of the extractive agent and certain impurities, is advantageously circulated in part through the column reboiler, the remainder being withdrawn from the system for reclamation and reuse of the extractive agent.

The cooled liquid fraction is in two phases: a lighter phase comprising essentially the major portion of the desired naphthalene and a minor portion of the extractive agent which phase, for convenience, may be termed the naphthalene phase, and a heavier phase comprising essentially a major portion of the extractive agent with a minor portion of the desired naphthalene. This latter phase may, for convenience, be termed the extractive agent phase and is returned to the fractionating column as reflux. The naphthalene phase is decanted and washed with the liquid azeotropic agent to remove the extractive agent from the naphthalene, and the washed naphthalene fed to a second fractionating column. The formation of two phases by the above cooled liquid fraction is not an essential feature of the process. If a single phase is formed, the fraction is apportioned between the reflux and washing steps with similar result. To the second column is also fed, at a point below the naphthalene feed and somewhat above the bottom, a stream of azeotropic agent as a vapor, or as a liquid to be vaporized in the column.

In the second fractionating column the washed naphthalene is contacted countercurrently with rising vapors of the azeotropic agent which pass up the column carrying with them a small amount of naphthalene azeotrope vapor and azeotropes of the azeotropic agent with impurities present in the washed naphthalene which are less polar than the naphthalene. Because the azeotropic agent is specified to be one forming azeotropes with hydrocarbons, including naphthalene, there is a natural tendency for the naphthalene to be vaporized as its azeotrope with the agent and carried up the column. However, it is a further essential feature of this invention that the column be operated, by sufficient adjustment of the usual flow and heating controls, in a manner to controvert this natural tendency and to cause the major portion of the naphthalene to flow down the column as a liquid. The overhead vapor fraction from the second column is condensed and cooled and the cooled liquid caused to separate into two phases: the one rich in naphthalene unavoidably vaporized with the azeotrope agent, and the other rich in azeotropic agent. The agent-rich phase may be lighter or heavier than the naphthalene-rich phase dependent upon the specific gravity of the particular agent used.

The naphthalene-rich phase containing the less polar impurities is withdrawn as a small amount of low grade naphthalene by-product. The agent-rich phase is withdrawn for recovery therefrom of the azeotropic agent and its content of low grade naphthalene, by distillation, or may be discharged to the sewer if the agent is water. Purified liquid naphthalene is withdrawn from the base of the column at a temperature high enough to prevent an undesirable concentration of the azeotropic agent or impurities boiling between the azeotropic agent and naphthalene. The purified liquid naphthalene withdrawn from the base of the column is the desired Refined Grade naphthalene product.

According to a further feature of the process of this invention, applicable in particular to cases where some types of impurities may be absent from the crude naphthalene, or where a product of relatively high purity but less than Refined Grade is suitable, it is possible to simplify the process by omission or modification of one or more of its features, as follows:

If no impurities are present which are low boiling with the extractive agent and high boiling with the azeotropic agent, then the functions of the two fractionating columns may be combined in and carried out in a single column, the extractive agent and the azeotropic agent both being fed to the combination column. This simplifies agent recovery, and reduces the total energy requirements. An additional specification for the agents is required in order to utilize this feature, in that the agents must not mutually form an azeotrope, since the single column must perform the incidental function of separating the agents so that only the extractive agent will pass to the lowermost section and only the azeotropic agent will pass to the uppermost section. Mixtures of both agent types, if present at the extremities of the column, would adversely affect the process.

If no non-polar impurities or impurities forming low boiling azeotropes with the extractive agent are present, the second column may be omitted entirely and the purified naphthalene obtained directly from the first column as the extractive agent azeotrope from which the agent may be separated by decantation and distillation or by washing with water. In case a product of somewhat lesser purity is acceptable, the quantity of agent fed to the column and withdrawn from the base may be greatly reduced.

If the only impurities present are those forming low boiling azeotropes with the azeotropic agent, then only the second column is required and the first column may be omitted.

In the accompanying drawing which forms part of the instant specification and is to be read in conjunction therewith:

Figure 1:
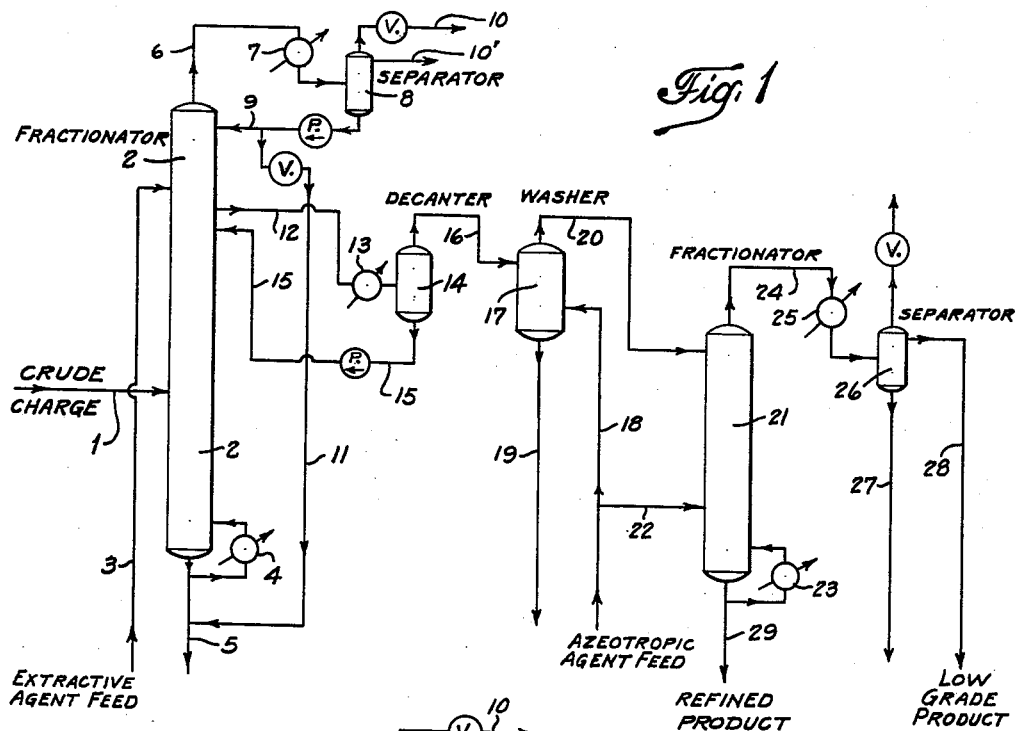
FIG. 1 is a view showing diagrammatically a preferred form of extractive distillation system for carrying out the process of this invention.

Referring now more particularly to FIG. 1, a crude naphthalene containing impurities which are low boiling with the extractive agent and high boiling with the azeotropic agent, and therefore requiring application of the full unmodified process, is fed as a liquid via line 1 to the lower section of the fractionating column 2. Simultaneously, a relatively high boiling extractive agent, preferably ethylene glycol, is fed via line 3 to the upper section. Vapor is generated from the body of liquid maintained in the base of the column, by heat supplied to the liquid through the medium of a reboiler 4, and rises through the column. The generated vapors include vapors of the relatively low boiling azeotrope of naphthalene with the ethylene glycol.

The liquid ethylene glycol passing down the column countercurrent to the rising vapors tends to extract from the vapors and carry down, impurities in the vapors more polar than naphthalene. Liquid in excess of that required to maintain the required liquid level in the base of the column, is removed from the base of the column via a line 5, as a liquid bottoms product or "tails." The "tails" may be steam stripped in known manner for recovery of the ethylene glycol for reuse. Vaporized non-polar impurities of the feed, and some azeotropes of ethylene glycol with impurities in the feed normally close boiling to naphthalene, having lower boiling points than the naphthalene azeotrope also pass up the column with the naphthalene azeotrope vapors. As shown, the overhead product and vaporized reflux leaving the top of the column via transfer line 6, is cooled and condensed in condenser 7. The condensate formed passes to the separator 8, and a major portion is pumped back to the fractionating column 2 via line 9, as essentially total reflux. Uncondensed vapors are discharged from the separator via valve-controlled line 10. Some low boiling impurities will tend to concentrate in the reflux liquid in separator 8 and may be withdrawn as a small cut via valve-controlled line 11 which, if desired, may be connected, as shown, into the "tails" withdrawal line 5, for disposal.

The principal desired naphthalene product from this extractive distillation step is withdrawn as a part of a liquid sidestream, via line 12, this stream being taken from a selected tray a few trays down from the top of the column. It is conducted through, and cooled in, cooler 13 and passes therefrom into decanter 14 wherein it separates into two liquid phases: a relatively light naphthalene phase low in glycol content, and a relatively heavy glycol phase low in naphthalene content.

The heavier glycol phase is withdrawn from the decanter 14 via line 15 and pumped back to the fractionator onto a selected tray below that from which the principal product was withdrawn.

If desired, and instead of withdrawing the principal product as a side stream from the column, the entire overhead product and vaporized reflux from the column may be condensed and cooled and passed from the separator 8 to the decanter 14 for separation and recovery of the naphthalene phase, in which case the heavier glycol phase may be pumped back to the fractionating column onto the top tray as reflux. Also, if desired, the heavier glycol phase leaving decanter 14 via line 15 may be further cooled or chilled and will give on such treatment a small yield of liquid or crystalline naphthalene of high purity. However, to take the whole desired naphthalene product by this method would require recirculation of large volumes of the glycol phase through the column 2, the decanter 14 and additional chilling equipment, with attendant increase in the total energy requirements of the process.

A stream of the lighter naphthalene phase is withdrawn from the decanter 14 and passed via line 16 to a washer 17 which is supplied via line 18 with a stream of the lower-boiling azeotropic agent, preferably water, which serves to wash the glycol extractive agent from the naphthalene. Thus, the liquid supplied to washer 17 is, in turn, separated therein into a heavier phase consisting essentially of the agents, glycol and water, and a lighter phase consisting essentially of naphthalene with a lesser content of impurities less polar than the naphthalene. The heavier phase is withdrawn from the washer via line 19 and may be sent to a recovery system, not shown, for recovery of the glycol, free of water, for re-use. The lighter naphthalene phase, that is, the washed naphthalene, is passed from the washer 17 via line 20 to a selected tray near the top of a second fractionating column 21 to which the azeotropic agent, preferably water, is supplied at a point below the naphthalene feed but above the base of the column, as by the line 22. As shown, the water is supplied as a liquid and heat is added to the column 21 by the reboiler 23. However, the water or any other low boiling azeotropic agent used may be supplied to the column as a vapor if desired.

The vapor passing up the column 21 carries with it a small amount of azeotropes of naphthalene and azeotropes of the azeotropic agent with impurities present which are less polar than the naphthalene. The vapor passing overhead from the column 21 via line 24 is condensed and cooled in condenser 25 and the liquid product obtained thereby collected in separator 26 in two liquid phases: the one rich in naphthalene and the other rich in the low-boiling azeotropic agent. The agent-rich phase may be lighter or heavier than the naphthalene-rich phase depending upon the specific gravity of the agent used.

In the system shown in FIG. 1 and with water as the azeotropic agent, the agent-rich phase is the lower phase and is withdrawn from the separator 26 via line 27, for disposal.

The upper or naphthalene-rich phase in the separator 26 containing the less polar impurities is withdrawn therefrom via the line 28 as a small amount of low grade byproduct.

The refined or purified naphthalene desired as a principal product is withdrawn as a liquid bottoms product from the fractionating column 21 via line 29, at a temperature high enough to prevent an undesirable concentration therein of the water or other lower boiling azeotropic agent or of impurities boiling between such agent and naphthalene.

For some industrial applications, a naphthalene product of somewhat lesser purity than commercial refined grade naphthalene, is suitable. According to a modification of the process of this invention, such a product may be obtained by distillation of the crude naphthalene in the presence of the extractive agent, preferably ethylene glycol, and with the column distillation conditions such that the portion of agent withdrawn via line 5 from the base of the column 1 is greatly reduced or even eliminated. In such case the naphthalene product of the distillation instead of being withdrawn from the column as a liquid side stream, via line 12, is taken overhead as a vapor along with vapors of the agent. From these vapors there may be recovered in the separator 8 a two phase liquid distillate fraction comprising a relatively light naphthalene phase having a content of the agent, and a relatively heavy agent phase having a content of naphthalene. The agent phase may be recycled to the column via line 9, and the naphthalene phase withdrawn from the separator via a draw-off line 10', for the recovery therefrom, as separate fractions, of its agent content and the desired naphthalene product. When using ethylene glycol as the agent and with the distillation conditions such that no glycol is withdrawn with the "tails" or residue leaving through bottoms withdrawal line 5, a naphthalene product of relatively high purity, e.g. F.P. 78.7° C., is obtainable.

The following examples are illustrative but in no way restrictive of the process of this invention as carried out in a system such as the one of FIG. 1 on crude naphthalene for the recovery of refined grade naphthalene as a desired product. The freezing point of pure naphthalene is 80.2° C. and conventionally the freezing points of naphthalene samples are used as an index of their purity. A lower freezing point is a reliable indication of lower naphthalene content. The grade of naphthalene designated by the trade as refined grade naphthalene has a freezing point of 79.7° C. corresponding to approximately 98.5% $C_{10}H_8$.

EXAMPLE 1

Crude naphthalene of 73.7° C. freezing point was fed to column 2 at a rate of 3 volumes per minute and glycol was supplied to the column at a rate of 4 volumes per minute. The temperature at the base of column 2 was 390° F. and at the top of the column, 360° F. Naphthalene product resulting from the extractive distillation and withdrawn from the column via line 12, was decanted in decanter 14 from the glycol at 200° F. and washed with water in washer 17, giving an intermediate upper phase product from washer 17 of 79.3° C. freezing point. This intermediate product after treatment in column 21 by azeotropic distillation with water as the azeotropic agent, gave a final refined naphthalene from the base of the column 21 with a freezing point of 79.7° C., which is the desired refined grade.

EXAMPLE 2

Crude naphthalene of 56° C. freezing point, corresponding to approximately 60% $C_{10}H_8$ was fed to column 2 at a rate of 8 volumes per minute and glycol was supplied to the column at a rate of 1 volume per minute. The temperature at the base of the column was 450° F. and at the top was 360° F. Naphthalene product of this distillation was withdrawn from the separator 8 and batch distilled for removal of glycol, giving a final naphthalene product of 78.7° C. freezing point. This is less than refined grade but is suitable for many industrial purposes.

Figure 2:
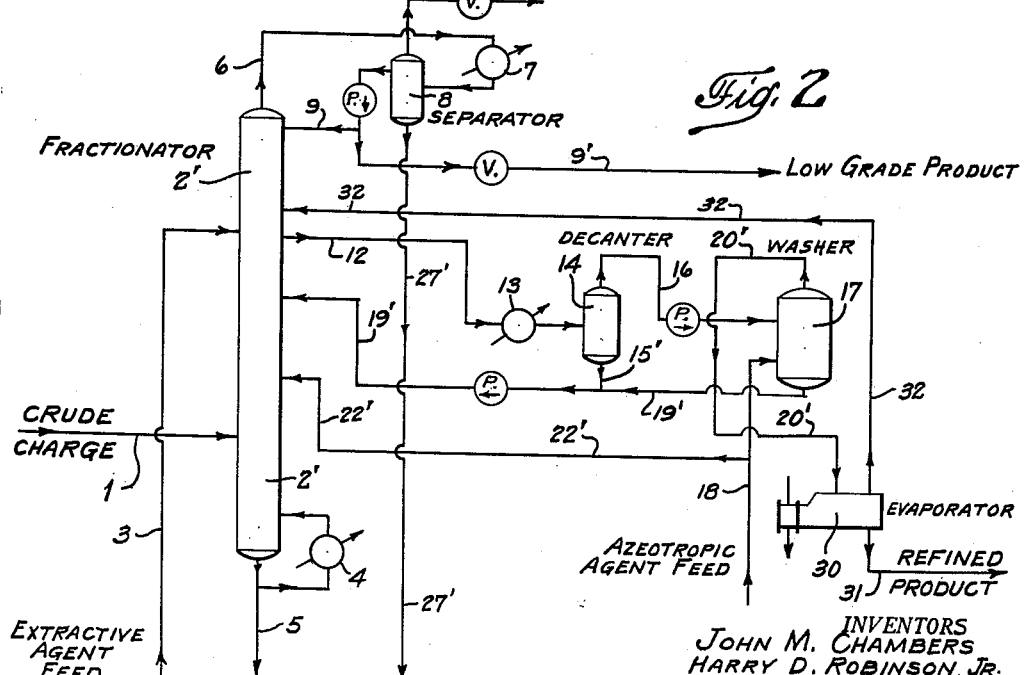
FIG. 2 is a view showing diagrammatically a modified form of extractive distillation system for carrying out the process of this invention.

Referring now more particularly to FIG. 2, there is depicted an application of the process to the case where there are no impurities present in the feed which form low-boiling azeotropes with the relatively high boiling extractive agent or form high-boiling azeotropes with the relatively low-boiling azeotropic agent. Hence, the functions of the separate columns 2 and 21 of FIG. 1 may be combined and performed in a single combination fractionating column 2'.

In the system there shown and as operated using glycol as the relatively high boiling extractive agent, and water as the relatively low boiling azeotropic agent, the glycol is supplied via line 3 to the column 2'. Water, however, is also supplied to the column 2' via line 18 and the branch line 22'. In this case, the fractionator overhead product including vaporized reflux passes via transfer line 6 through condenser 7 to the reflux accumulator separator 8 from which uncondensed vapors are discharged via valve-controlled line 10. The condensate accumulating in the vessel 8 separates in the latter into two liquid phases: a relatively light phase which contains unavoidably vaporized naphthalene in which low-boiling and non-polar impurities of the feed tend to concentrate, and a heavier phase consisting essentially of water used as the low-boiling azeotropic agent. A stream of the light phase liquid is continuously removed from the separator 8, via reflux return line 9' a part being recycled thereby to the column 2' for refluxing the column and the remainder being diverted from the line 9' via line 28' for discharge from the system as a low-grade naphthalene by-product. A stream of the heavier phase (water) is continuously removed from the separator 8 via withdrawal line 27' for discharge from the system. Glycol and extracted impurities leave the column 2' via bottoms withdrawal line 5. The principal desired naphthalene product is withdrawn from the column 2' as a liquid sidestream through line 12 and, as before, passed thereby through the cooler 13 into the decanter 14. This cooled sidestream liquid has a content of both the low-boiling azeotropic agent, water, and the high-boiling extractive agent, ethylene glycol, employed in this case. The cooled sidestream separates in the decanter 14 into two liquid phases; a relatively light upper phase rich in the desired naphthalene, and a heavier lower phase rich in water and glycol.

The upper, or naphthalene-rich phase, is passed via the line 16 to the washer 17 and washed therein with water supplied by the line 18, to produce as a lighter phase in the washer, an upper, or washed-naphthalene phase and a lower, or water-glycol phase.

This upper phase is passed via the line 20' to the evaporator 30 and there subjected to simple distillation, the refined naphthalene product being withdrawn via the line 31 and the water vapor recycled directly to the column 2' via line 32.

The lower, or water-glycol phase, separating in washer 17 does not have to be sent to a separate distillation-recovery system as in the process of FIG. 1, but is conducted from the washer via line 19' and combined therein with the glycol-phase stream issuing from the lower portion of the decanter 14 via line 15', and the combined stream returned via the line 19' to the combined fractionator 2' for further processing.

What is claimed is:

1. A process for the treatment of crude naphthalene to recover purified naphthalene as a product, comprising the steps of: extractively distilling the crude in the presence, as extractive agent, of ethylene glycol; recovering from vapors distilled from the crude a liquid naphthalene fraction having a content of ethylene glycol and impurities less polar than naphthalene; washing said fraction with water to remove the ethylene glycol; azeotropically distilling said washed naphthalene fraction in the presence of additional quantities of water, to vaporize as water azeotropes impurities of said fraction which are less polar than naphthalene; and recovering as a liquid residue product of the azeotropic distillation the desired purified naphthalene product.

2. A process for the treatment of crude naphthalene to recover purified naphthalene as a product, comprising the steps of: extractively distilling the crude in the presence of ethylene glycol; recovering from vapors distilled from the crude, a liquid naphthalene fraction having a content of ethylene glycol; washing said fraction with water to remove the ethylene glycol; distilling the washed fraction to vaporize the water; and, recovering the water-free fraction as the desired purified naphthalene product.

3. A process for the treatment of crude naphthalene to recover purified naphthalene as a product, comprising the steps of: extractively distilling the crude in an extractive distillation zone in the presence of ethylene glycol as extractive agent; recovering as a residue product a liquid extract of ethylene glycol and impurities more polar than naphthalene; recovering from vapors distilled from the crude a two-phase liquid distillate fraction comprising a relatively light naphthalene phase having a content of ethylene glycol, and a relatively heavy glycol phase having a content of the desired naphthalene; recycling said glycol phase to the extractive distillation zone for reprocessing; washing the naphthalene phase with water to remove the glycol therefrom; recovering as products of said washing operation a relatively heavy liquid phase comprised essentially of glycol and water, and a relatively light liquid phase comprised essentially of naphthalene; azeotropically distilling said washed naphthalene phase in the presence of additional quantities of water; recovering from the resulting vapors a two-phase liquid distillate fraction comprising a water phase and a low grade naphthalene product phase; recovering from said fraction low grade naphthalene as a product; and, separately recovering as a liquid residue product of the azeotropic distillation, the desired purified naphthalene.

4. A process for the treatment of crude naphthalene to recover purified naphthalene as a product, comprising extractively and azeotropically distilling the crude in a single fractionating column while supplying ethylene glycol and water to the central section of said column; recovering a glycol extract product as a bottoms product containing impurities; recovering from vapors distilled overhead from said fractionating column a two-phase liquid distillate fraction comprising naphthalene and water, said naphthalene containing concentrated non-polar impurities and removed as a low grade by-product; withdrawing from the column a liquid side stream fraction; cooling and decanting this fraction to recover a naphthalene phase and a heavier glycol-water phase; recycling said glycol-water phase to the fractionating column; washing said naphthalene phase with water to remove dissolved glycol and form two phases, a relatively heavy water-glycol phase and a lighter naphthalene phase; recycling said water-glycol phase to the fractionating column; evaporating the water from the lighter naphthalene phase and recycling the water to the fractionating zone; and, recovering the residue product of said evaporating step as the desired purified naphthalene.

5. A process for the treatment of crude naphthalene to recover purified naphthalene as a product comprising the steps of: extractively distilling the crude in a distillation zone in the presence of ethylene glycol such that the naphthalene vapors rise countercurrently to the downflowing liquid glycol; recovering, as the residue product of the distillation, the major portion of the glycol, containing in solution most of the impurities formerly found in the crude naphthalene; recovering from vapors distilled from the crude a two phase liquid distillate fraction comprising a relatively light naphthlene phase having a minor content of the glycol, and a relatively heavy glycol phase having a content of naphthalene; recycling said heavy glycol phase to the distillation zone; and recovering from said naphthalene phase, as separate fractions, its minor glycol content and the desired purified naphthalene product.

6. A process for the treatment of crude naphthalene to recover purified naphthalene as a product comprising the steps of: extractively distilling the crude naphthalene in an extraction distillation zone in the presence of a liquid compound selected from the group of liquid compounds consisting of: ethylene glycol, glycerol, benzyl alcohol, and mixtures thereof, the extractive distillation comprising: supplying the naphthalene feedstock to an extractive distillation zone at one level thereof and supplying the liquid extractive agent to said zone at a higher level, heating the feedstock supplied to a distillation temperature at which the feedstock is vaporized, the resulting vapors passing upwardly in said zone countercurrent to, and in contact with, downflowing extractive agent, and maintaining both the distillation temperature in said zone and the respective quantities of extractive agent and feedstock supplied to said zone, at levels at which the major portion of the downflowing extractive agent is maintained in its liquid state and the tendency of naphthalene to dissolve in the liquid extractive agent, which is natural in a cool liquid state, is thereby largely prevented; recovering from vapors distilled from the crude naphthalene a two phase liquid distillate fraction comprising a relatively light naphthalene phase having a minor content of the extractive agent, and a relatively heavy extractive agent phase having a content of naphthalene; recycling said heavy extractive agent phase to the distillation zone; separately distilling said naphthalene phase to recover said minor extractive agent content; and recovering, as a second fraction, from said separate distillation, the desired purified naphthalene product.

7. A process for the treatment of crude naphthalene, to recover refined grade naphthalene as a product, comprising the steps of: extractively distilling the naphthalene feedstock, in the presence, as extractive agent, of a liquid compound selected from the group of liquid compounds consisting of: ethylene glycol, glycerol, benzyl alcohol, and mixtures thereof, the extractive distillation comprising: supplying the naphthalene feedstock to an extractive distillation zone at one level thereof and supplying the liquid extractive agent to said zone at a higher level, heating the feedstock supplied to a distillation temperature at which the feedstock is vaporized, the resulting vapors passing upwardly in said zone countercurrent to, and in contact with, downflowing extractive agent, and maintaining both the distillation temperature in said zone and the respective quantities of extractive agent and feedstock supplied to said zone, at levels at which the major portion of the downflowing extractive agent is maintained in its liquid state and the tendency of naphthalene to dissolve in the liquid extractive agent, which is natural in a cool liquid state, is thereby largely prevented; removing, as a liquid residue product of the extractive distillation, an extract comprised of a major portion of the extractive agent and impurities, free of naphthalene; recovering from vapors distilled from the feedstock a two-phase liquid distillate fraction comprising a relatively light naphthalene phase having a small content of such extractive agent, and a relatively heavy extractive agent phase which is a minor portion of the total agent quantity; recycling the whole of said extractive agent phase to the extractive distillation zone for further use; freeing the light naphthalene phase of its small content of extractive agent; azeotropically distilling the light naphthalene phase free of extractive agent, in the presence, as azeotropic agent, of a liquid compound selected from the group of liquid compounds consisting of: water, ethanol, acetic acid, and mixtures thereof, the azeotropic distillation comprising: supplying the azeotropic agent to an azeotropic distillation zone at one level thereof and supplying said light naphthalene phase free of extractive agent to said zone at a higher level thereof, heating the azeotropic agent supplied, to a distillation temperature at which the agent is vaporized, the resulting vapors passing upwardly in said zone countercurrent to, and in contact with, said downflowing light naphthalene phase, and maintaining both the distillation temperature in said zone and the respective quantities of said azeotropic agent and said light naphthalene phase supplied to said zone, at levels at which the major portion of said light naphthalene phase is maintained in its liquid state and the tendency of naphthalene to be vaporized along with the azeotropes of said agent and impurities, is thereby largely prevented; recovering from the vapors a liquid distillate fraction consisting primarily of said azeotropic agent, with a small quantity of low grade naphthalene by-product; and, separately recovering as a liquid residue product of the azeotropic distillation free of azeotropic agent, the desired refined grade naphthalene.

8. A process for the treatment of crude naphthalene to recover refined grade naphthalene as a product, comprising the steps of: extractively distilling naphthalene feedstock, in the presence, as extractive agent, of a liquid compound selected from the group of liquid compounds consisting of: ethylene glycol, glycerol, benzyl alcohol, and mixtures thereof, the extractive distillation comprising: supplying the naphthalene feedstock to an extractive distillation zone at one level thereof and supplying the liquid extractive agent to said zone at a higher level, heating the feedstock supplied to a distillation temperature at which the feedstock is vaporized, the resulting vapors passing upwardly in said zone countercurrent to, and in contact with, downflowing extractive agent, and maintaining both the distillation temperature in said zone and the respective quantities of extractive agent and feedstock supplied to said zone, at levels at which the major portion of the downflowing extractive agent is maintained in its liquid state and the tendency of naphthalene to dissolve in the liquid extractive agent, which is natural in a cool liquid state, is thereby largely prevented; removing, as a liquid residue product of the extractive distillation, an extract comprised of a major portion of the agent and of impurities, free of naphthalene; recovering from vapors distilled from the feedstock, a liquid naphthalene fraction having a minimum content of said extractive agent; treating said liquid naphthalene fraction to remove said content of extractive agent; azeotropically distilling the treated naphthalene fraction in the presence, as azeotropic agent, of a liquid compound selected from the group of liquid compounds consisting of: water, ethanol, acetic acid, and mixtures thereof, the azeotropic distillation comprising: supplying the azeotropic agent to an azeotropic distillation zone at one level thereof and supplying said treated naphthalene fraction to said zone at a higher level thereof, heating the azeotropic agent supplied, to a distillation temperature at which the agent is vaporized, the resulting vapors passing upwardly in said zone countercurrent to, and in contact with, said downflowing treated naphthalene fraction, and maintaining both the distillation temperature in said zone and the respective quantities of said azeotropic agent and said treated naphthalene fraction supplied to said zone, at levels at which the major portion of said treated naphthalene fraction is maintained in its liquid state and the tendency of naphthalene to be vaporized along with the azeotropes of said agent and impurities, is thereby largely prevented such that the quantity of naphthalene in the azeotropic agent distilled product is a small portion of the total naphthalene; and, recovering the desired refined grade naphthalene as a liquid residue product of said azeotropic distillation operation.

9. A process for the treatment of naphthalene to recover purified naphthalene as a product, comprising the steps of: extractively and azeotropically distilling the naphalene feedstock in a single fractionating column while supplying the feedstock to the lower section of the column, supplying as extractive agent, just above the central section of the column, a liquid compound selected from the group of liquid compounds consisting of: ethylene glycol, glycerol, benzyl alcohol, and mixtures thereof, and supplying as azeotropic agent, just below the central section of the column, a liquid compound selected from the group of liquid compounds consisting of: water, ethanol, acetic acid, and mixtures thereof; heating the feedstock and azeotropic agent supplied, to a distillation temperature at which the feedstock and azeotropic agent are vaporized in the lower section of the column, the resulting vapors passing upwardly in said column countercurrent to, and in contact with downflowing extractive agent; maintaining both the distillation temperature in said lower section and the respective quantities of extractive agent, azeotropic agent and feedstock supplied to said column, at levels at which the major portion of the downflowing extractive agent is maintained in its liquid state whereby the tendency of naphthalene to dissolve in the extractive agent, which is natural in a cool liquid state, is largely prevented, and at which levels the naphthalene vapors are condensed in the upper section of the column and thence returned downward as a liquid countercurrent to rising vapors of the low-boiling azeotropic agent, said condensed naphthalene thus arriving at the central section of the column as a liquid; recovering and removing from the column, as a liquid residue product of the distillation, an extractive agent and impurities mixture free of naphthalene and free of azeotropic agent; recovering from vapors distilled overhead from said fractionating column a liquid distillate fraction comprising azeotropic agent, free of extractive agent, and a small portion of the total naphthalene, said liquid distillate fraction also containing concentrated impurities; recovering said small portion of naphthalene with its content of impurities, as a low grade naphthalene by-product; withdrawing from the central section of the column a liquid side stream fraction comprising the desired naphthalene product with a content of extractive azeotropic agents; separating said liquid side stream fraction to obtain its agent content therefrom; recycling the separated agent content to the fractionating column; and, recovering the agent-free naphthalene content of said side stream fraction as the desired purified naphthalene.

References Cited in the file of this patent

UNITED STATES PATENTS

| 2,290,636 | Deanesly | July 21, 1942 |
| 2,339,576 | Luten | Jan. 18, 1944 |
| 2,361,493 | Patterson | Oct. 31, 1944 |
| 2,459,403 | Ahrens | Jan. 18, 1949 |
| 2,567,228 | Morrell et al. | Sept. 11, 1951 |
| 2,773,006 | Carver | Dec. 4, 1956 |
| 2,878,261 | Broughton | Mar. 17, 1959 |

FOREIGN PATENTS

| 668,853 | Great Britain | March 1952 |

OTHER REFERENCES

Industrial and Engineering Chemistry: Hibshman, vol. 41, No. 7 (pp. 1366–1369), 1949.

Techniques of Organic Chemistry, vol. IV, Interscience Publ. Inc., N.Y., 1951 (pp. 338 and 339 relied on).

UNITED STATES PATENT OFFICE
CERTIFICATE OF CORRECTION

Patent No. 3,075,890　　　　　　　　　　　　　　　January 29, 1963

John M. Chambers et al.

It is hereby certified that error appears in the above numbered patent requiring correction and that the said Letters Patent should read as corrected below.

Column 2, line 52, for "azeotrope" read -- azeotropic --; column 10, line 44, for "extractive azeotropic" read -- extractive and azeotropic --.

Signed and sealed this 5th day of November 1963.

(SEAL)
Attest:

ERNEST W. SWIDER
Attesting Officer

EDWIN L. REYNOLDS

Acting Commissioner of Patents